United States Patent [19]

Crampton et al.

[11] Patent Number: 4,499,773
[45] Date of Patent: Feb. 19, 1985

[54] VARIABLE CAPACITANCE PRESSURE TRANSDUCER

[75] Inventors: Arthur W. Crampton, Concord; Hollis L. Gray, Jr., Wayland; Seymour Mermelstein, Newton, all of Mass.

[73] Assignee: Dresser Industries, Inc., Dallas, Tex.

[21] Appl. No.: 489,659

[22] Filed: Apr. 28, 1983

[51] Int. Cl.³ ............................ G01L 9/12; H01G 7/00
[52] U.S. Cl. ........................................ 73/718; 73/724; 73/756; 361/283
[58] Field of Search .............. 73/724, 718, 756, 708; 361/283

[56] References Cited

U.S. PATENT DOCUMENTS

| | | | |
|---|---|---|---|
| 2,368,278 | 1/1945 | Warshaw | 361/283 |
| 2,667,786 | 2/1954 | Spaulding | 361/283 |
| 3,195,028 | 7/1965 | Werner et al. | 317/246 |
| 3,479,879 | 11/1969 | Music | 73/718 |
| 3,557,621 | 1/1971 | Ferran | 73/398 |
| 4,168,517 | 9/1979 | Lee | 361/283 |

Primary Examiner—Donald O. Woodiel
Attorney, Agent, or Firm—Daniel Rubin

[57] ABSTRACT

A capacitance type pressure transducer having a removable capacitor plate formed of a ceramic substrate containing a conductive film spaced in a controlled relation opposite a tensioned metal membrane. For precluding temperature induced differential forces from adversely affecting transducer accuracy, the controlled relation between the capacitor plate and metal membrane is maintained by a plurality of flexure pins of selective deflection properties securing the assembled spacing therebetween.

9 Claims, 7 Drawing Figures

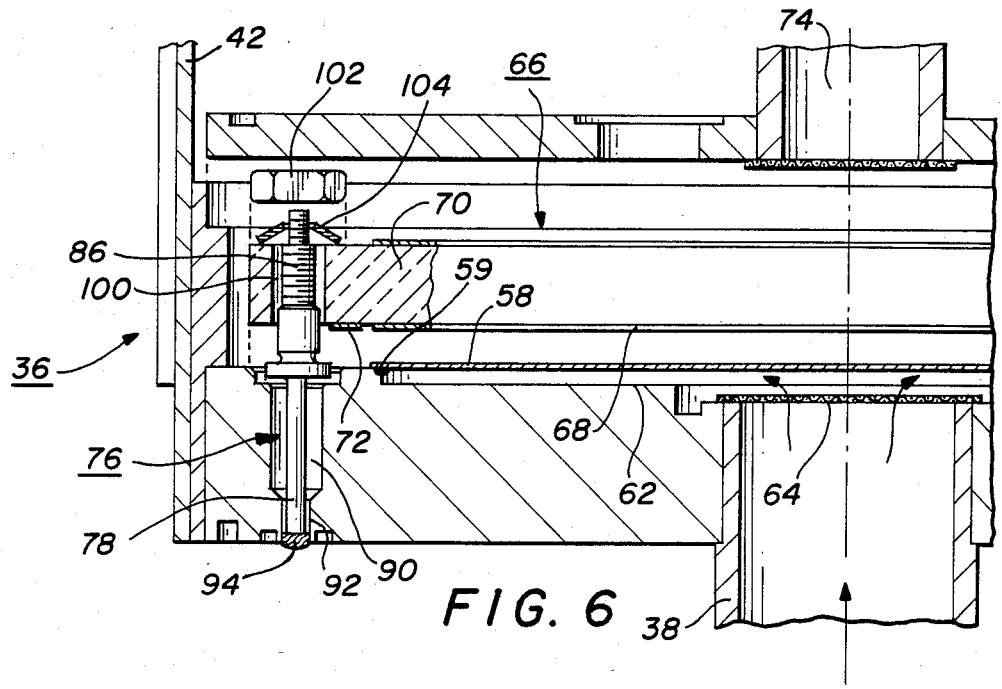
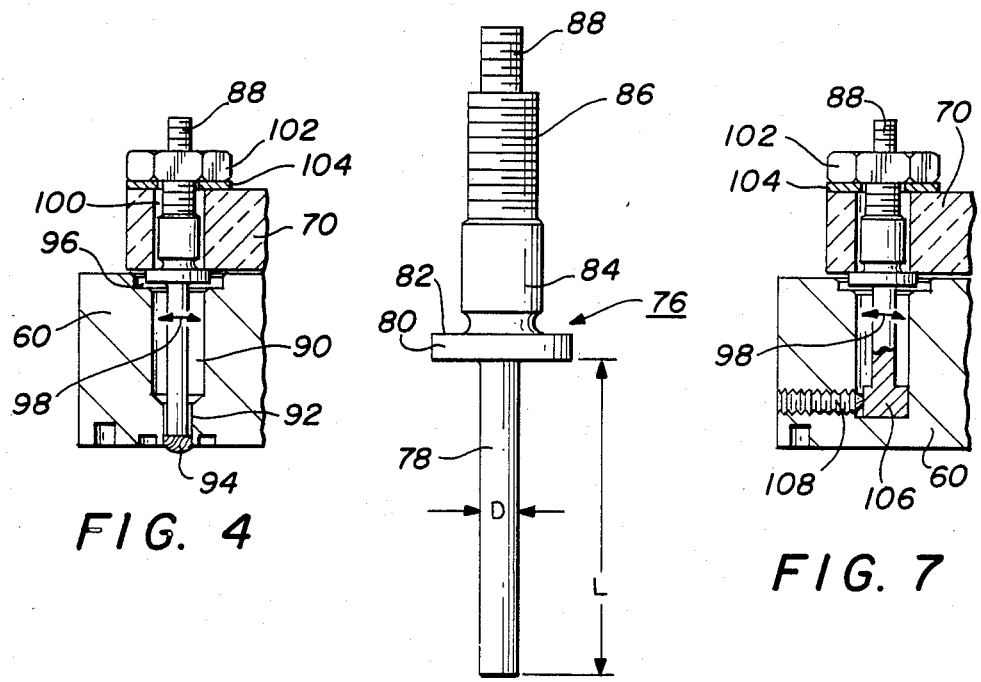
FIG. 6
FIG. 4
FIG. 5
FIG. 7

VARIABLE CAPACITANCE PRESSURE TRANSDUCER

BACKGROUND OF THE INVENTION

1. The technical field to which the invention pertains includes the art of measuring and testing as directed to fluid pressure transducers.

2. High accuracy, low range pressure transducers of the capacitance type are disclosed, for example, in U.S. Pat. Nos. 3,195,028 and 3,557,621. Pressure transducers of this basic type are commercially available from a plurality of manufacturers and typically are comprised of a circular metal membrane supported under radial tension opposite a capacitor plate and separating two gas type plenums. A difference in pressure incurred by the plenums deflects the membrane which in turn produces an electrical output from variation in electrical capacitance incident to the changed position of the membrane relative to the capacitor. In a typical construction, the capacitor plate is formed by depositing a conductive film on an insulating substrate such as ceramic or glass. Positioning of the ceramic substrate relative to the membrane support structure serves to establish the range of capacitance values generated by membrane motion.

To facilitate iteration of the nominal capacitance values and in-process manufacturing procedures, it has been found convenient to mount the ceramic substrate on the membrane support structure in a manner that is readily removable. Typically, in that arrangement the ceramic plate rests against a precision registration surface and is held in position by a combination of forces including friction forces at the ceramic-to-metal interface and a spring force extending perpendicular to the registration surface.

While the foregoing arrangement has generally functioned well to provide the expected accuracy of such instruments under stable operating conditions, it has been found to produce inaccurate indications of measured pressures when the assembly incurs changes in temperature. That is, as a result of temperature change it has been determined that a differential force is generated in a radial direction parallel to the membrane surface. Moreover, the magnitude of the problem is compounded somewhat where the ceramic substrate and the membrane support structure have different thermal coefficients of expansion. However, even where the thermal coefficients of expansion are identical, these forces are generated during thermal transients where temperature gradients exist throughout the structure.

A consequence of the foregoing forces is to induce slippage at the registration surface, as well as force couples which distort the structure as a whole. Distortion, in turn, causes motion of the capacitor plate relative to the membrane in the absence of a pressure input and is, therefore, a source of undesired output or error. At the same time, after such slippage has occurred, residual radial stresses are produced, and that in turn tends to produce a non-repeatable undesired output.

Further complicating the adverse force problem is that in transducer units having full scale below one atmosphere, a common occurrence is for the membrane to be deflected by an overload input pressure into contact engagement against the capacitor plate. The latter tends to alter the friction force relationship at the registration surface and from which slippage at the interface can eventually result.

While the instrument error produced by the foregoing forces has generally been recognized, a ready solution therefor has not heretofore been known.

SUMMARY OF THE INVENTION

The invention relates to a capacitance type pressure transducer and more specifically to a sensor therefor having a removable ceramic substrate arranged in a manner able to significantly reduce, if not eliminate, the adverse force effects of the prior art induced by temperature differential and overpressure.

This is achieved in accordance with the invention by securing the ceramic substrate to a tension plate by means of a plurality of flexure pins characterized by deflection properties able to absorb the anticipated temperature induced differential forces by elastic bending. At the same time, the substrate is assembled to the tension plate via a nut threaded onto the flexure pin and adjusted to compress a Bellville washer with a force greater than the force of an anticipated overpressure. This permits the flexure pins to elastically stretch longitudinally in response to the forces exerted by the membrane so that recovery shows no or insignificant effect from the overpressure.

It is therefore an object of the invention to provide an improved construction for a capacitance type pressure transducer.

It is a further object of the invention to effect the foregoing object with an improved construction able to substantially offset the adverse effects on instrument accuracy imposed by temperature differential and/or overpressure to which the transducer is subjected.

BRIEF DESCRIPTION OF THE DRAWINGS

FIG. 4 is an enlarged view of the encircled portion 4 of FIG. 2;

FIG. 5 is an enlarged view of the pin fastener of FIG. 4;

FIG. 6 is an exaggerated and partially exploded fragmentary sectional elevation for the pressure sensor of FIG. 2; and FIG. 7 is an alternative embodiment to the arrangement of FIG. 4.

Figure 1:
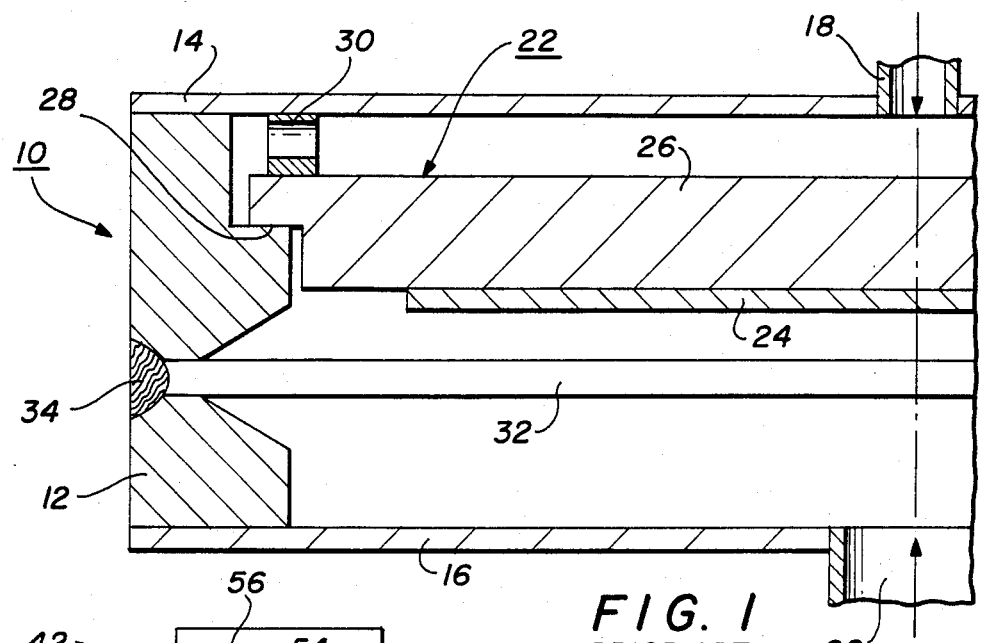
FIG. 1 is an exaggerated fragmentary sectional elevation of a prior art capacitance type pressure sensor.

Referring first to the prior art construction of FIG. 1, the pressure sensor thereof, generally designated 10, is comprised of a sleeve-like housing 12 closed at opposite ends by covers 14 and 16 having pressure inlets 18 and 20, respectively. Internally, there is included a capacitor plate 22 formed by depositing a conductive film 24 on a glass or ceramic substrate 26. To enable removal of capacitor plate 22, its substrate periphery rests against a precision registration surface 28 where it is held in position by friction forces at the ceramic-to-metal interfaces thereat. Imposing a friction force for that purpose is a wave washer 30 compressed between the substrate and the underside of cover 14. The metal membrane 32 is secured in housing 12 by weld 34 so as to maintain a controlled space relation between the membrane and capacitor plate 22. As can be appreciated from the discussion above, this method of mounting incurs problems of instrument error when the assembly is subject to changes in temperature and/or overpressure.

Figure 2:
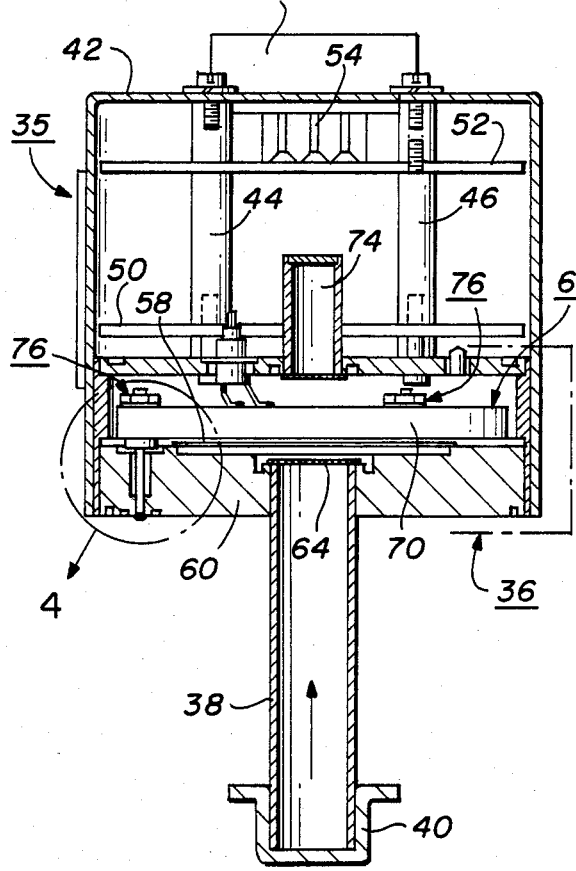
FIG. 2 is a sectional elevation through a capacitance type pressure transducer incorporating the invention.

Referring now to FIG. 2, a pressure transducer embodying the sensor invention hereof is designated 35 and includes the sensor portion contained within the phantom outline 36 having a pressure inlet tube 38 shown with a closure cap 40 utilized to protect the inlet in the course of shipment. An opposite inlet 74 can either be utilized for connecting a second pressure source or can be sealed for maintaining a vacuum thereat. Secured superposed on the sensor is a cap 42 secured via tubular standoffs 44 and 46. A plurality of spacer standoffs 48 support printed circuit board 50 while circuit box 52 contains electrical connectors 54 leading to terminal strip 56.

Sensor 36, in ccordance herewith, as will be described more particularly with reference to FIGS. 4-6, includes a metal membrane 58 secured via a weld 59 to a support structure or tension plate 60 opposite a counterbore 62 exposed to pressure inlet 38. A screen 64 is positioned at the inboard end of the inlet 38 for the purpose of filtering. Capacitor plate 66, like capacitor 22 above, includes a conductive film 68 deposited on a glass or ceramic substrate 70. Also deposited on substrate 70 is a second film 72 forming a reference capacitor for purposes of operation as will be understood.

For securing the position of capacitor plate 66 while rendering it removable in an elastic system able to offset the aforementioned adverse forces of temperature differential, substrate 70 is secured to tension plate 60 by means of a plurality of uniformly spaced flexure pins 76. For the embodiment being described, three flexure pins 76 are utilized arranged in a common circle, and as best seen in FIGS. 4 and 5, each pin 76 comprises a deformable bottom shank 78 merging with a flange 80. The top surface 82 of the flange provides a bearing surface for support of substrate 70 and from which extends an upper shank 84 that includes a screw thread 86 oppositely faced at the end to define wrench flats 88.

To receive and anchor each pin 76 in position, substrate 60 includes a well 90 communicating with a bore 92 in which the end of shank 78 is positioned and welded at 94. At its upward end well 90 communicates with a counterbore 96, both of which are sufficiently larger in width than the pin components thereat to enable sideways deflection of the pin as represented by arrow 98 and as will be described. Aligned axially with well 90 is a bore 100 in the substrate that accommodates the upper pin shank 84. This enables the flexure pin to secure the substrate thereat in position via a nut 102 and one or more compressed Bellville washers 104. In the alternative embodiment of FIG. 7, the lower end of pin 76 includes a block 106 anchored in position by means of a set screw 108.

Critical to the invention hereof are the properties of flexure pin 76 as will enable the aforementioned temperature induced differential forces to be absorbed in order to maintain instrument accuracy during such time when the forces are being imposed. For those purposes, pin 76 is preferably of the same metal composition as tension plate 60, thereby assuring the same coefficient of linear expansion and thereby minimize creation of forces that could otherwise arise from a difference therebetween. In a preferred embodiment, both pin 76 and tension plate 60 are of Inconel 600 characterized by modulus of elasticity of $30 \times 10^6$ psi and a yield stress of about 40,000 psi. For the embodiment being described, temperature swings from a room temperature of 25° C. are anticipated between about plus 100° C. to minus 40° C. while during operation are anticipated between about plus 40° C. to minus 25° C. At a temperature differential of 40° C., this results in a radial force imposed against the flexure pin of 0.74 lbs. or about 0.185 lbs. per degree C. The maximum bending stress that results against the flexure pins is on the order of 8900 psi.

To absorb these forces, lower shank 78 of flexure pin 76 is designed for deformation within its elastic limit at least matched to exceed the forces to be encountered. For achieving the intended properties the length L and diameter D relationship of pin 76 can be designed in any accommodating combination in which: (a) the shearing force induced in the pin by the encountered external forces and temperature changes is less than the available friction force at the joint between pin 76 and substrate 70; (b) the bending stress induced in the flexure pin under the same conditions is less than the yield stress of the pin material; and (c) the flexure pin has sufficient strength to accommodate normal handling and operation without failure.

For the embodiment being described, three flexure pins 76 were utilized in 120 degrees displaced on a common circumference with a length L of 0.500 inches and of diameter D of 0.0568 inches. Likewise essential to the relationship is that nut 102 when installed is adjusted to compress the Bellville washer 104 with an axial force greater than that exerted by membrane 58 against substrate 70 when in a normal overpressure mode. At the same time, it is necessary to create a friction force at the joint between pin 76 and substrate 70 sufficient to maintain mechanical integrity without slippage under the imposed forces.

Figure 3:
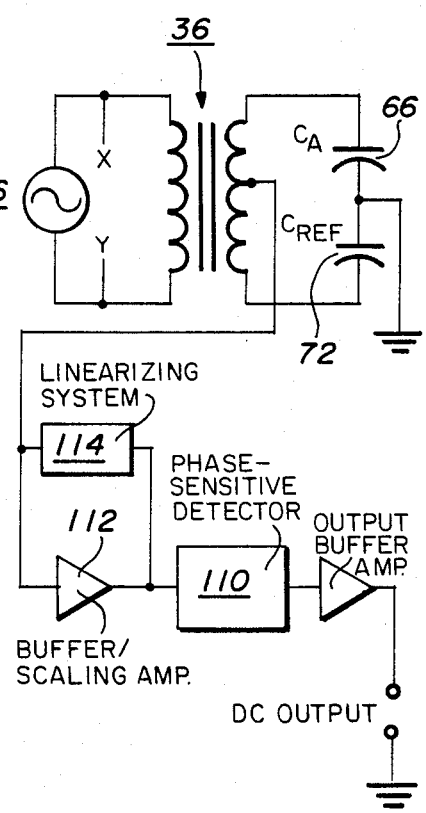
FIG. 3 is a functional schematic diagram for the transducer of FIG. 2.

Operation of transducer 35 can be understood with reference also to FIG. 3 that is responsive to input pressure supplied via inlet tube 38 of sensor 36. Increases in pressure thereat increasingly deflect the thin radially tensioned metal diaphragm 58 toward capacitor 66, and the changing position thereof is measured by converting the displacement into a variation in electrical capacitance. This varying capacitance forms one element of a fixed frequency, constant excitation level bridge circuit. Changes in capacitance caused by pressure unbalances the bridge and produces an AC signal related to pressure. After electrically scaling the AC signal, it is demodulated with a phase sensitive detector 110 to convert it into a DC voltage. The bridge output signal feeds into a high impedance amplifier 112 whose characteristics are adjusted bu linearizer 114 to linearize the signal so that the output DC voltage may be made linear within close tolerances of applied pressure.

In the event temperature change and/or overpressure is encountered by transducer 35, the accuracy of sensor 36 is substantially if not completely unaffected. When such forces are encountered, the combination of pin deflection 98 and the axial force imposed by pin 76, washer 104 and nut 102 in the fastened joint thereat enable the forces to be absorbed and withstood.

By the above description there is disclosed a novel structure for capacitor type pressure transducers having a removable sensor construction able to eliminate the inaccuracies created by previously uncontrolled forces such as those induced by temperature differentials to which the instrument has been exposed. By use of a fastener assembly securing the capacitor plate to the tension plate via a plurality of flexure pins having critically matched deflection properties, the previous problems thereat are readily and simply overcome by enabling such forces to be absorbed. Since the forces are being absorbed without adversely being imposed upon instrument measurement in the manner of the prior art, the virtues of instrument accuracy can be maintained without regard to the destructive effect such forces have had on similar type instruments of the prior art.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a capacitor type pressure transducer including a pressure sensor comprised of a tensioned membrane, a tension plate supporting said membrane secured thereto, a removable capacitor plate positioned in a controlled superposed relation spaced from said membrane, and at least one pressure inlet in communication with said membrane and adapted to receive a source of pressurized fluid, the improvement for supporting said capacitor plate in said position relative to said membrane and comprising a plurality of flexible pins extending in a secured connection between said capacitor plate and said tension plate, each of said pins being characterized by deflection properties at least matched to absorb the potential force anticipated to be induced by an encountered temperature differential and imposed between said membrane and said capacitor plate.

2. A capacitor type pressure transducer according to claim 1 in which said flexure pins are located on a common circumference about the surface of said capacitor plate uniformly spaced from each other.

3. In a capacitor type pressure transducer according to claim 2 in which one end of said flexure pins is anchored in one of said tension plate or said capacitor plate and the other of said tension plate or said capacitor plate includes a bore through which the other end of said pins extend.

4. In a capacitor type pressure transducer according to claim 3 in which each of said flexure pins is anchored to said tension plate and said tension plate includes a well longitudinally surrounding each of said pins from a location beyond the anchor to permit radial deflection of the pin in response to encountering said potential force.

5. In a capacitor type pressure transducer according to claims 2, 3 or 4, in which said secured pin connection between said capacitor plate and said tension plate imposes an axial force therebetween exceeding a contemplated overpressure force when said membrane is in an overpressure mode bearing against said capacitor plate.

6. In a capacitor type pressure transducer according to claim 5 in which each of said pins includes an annular flange at a longitudinally intermediate location and said flange defines a bearing surface on which said capacitor plate is seated.

7. In a capacitor type pressure transducer according to claim 6 in which the axial force imposed by said pin connection also creates a friction force at said bearing surface sufficient to withstand the encounter of said potential force without slippage.

8. In a capacitor type pressure sensor according to claim 7 in which said other end of said pins is threaded and there is included a spring washer and a nut threadedly set on said other pin end to effect said connection and in cooperation with said pin exert the level of axial force being imposed thereat.

9. In a capacitor type pressure sensor according to claim 5 in which said flexure pins and said tension plate are of compositions having a like thermal coefficient of expansion.

* * * * *